United States Patent [19]

Delahaye

[11] Patent Number: 5,138,301

[45] Date of Patent: Aug. 11, 1992

[54] RAIN GAUGE WITH CLOGGING DETECTION DEVICE

[75] Inventor: Jean Y. Delahaye, Vanves, France

[73] Assignee: France Telecom, Paris, France

[21] Appl. No.: 650,240

[22] Filed: Feb. 4, 1991

[30] Foreign Application Priority Data

Feb. 8, 1990 [FR] France ................................ 90 01470

[51] Int. Cl.$^5$ ............................................. G08B 21/00
[52] U.S. Cl. ....................................... 340/607; 340/602; 73/171
[58] Field of Search ................... 340/607, 602; 73/171, 73/38; 210/85, 88; 137/551; 250/215

[56] References Cited

U.S. PATENT DOCUMENTS 3,943,762  3/1976  Baer ...................................... 73/171

FOREIGN PATENT DOCUMENTS 3716049  11/1988  Fed. Rep. of Germany .

OTHER PUBLICATIONS

Patent Abstracts of Japan, vol. 9, No. 221 (P-386) Sep. 7, 1985; and JP-A-60 080 741 (Sanyo) Aug. 5, 1985 (Abstract).

Patent Abstracts of Japan, vol. 9, No. 221 (P-386) Sep. 7, 1985; and JP-A-60 080 740 (Sanyo) Aug. 5, 1985 (Abstract).

*Primary Examiner*—Jin F. Ng
*Assistant Examiner*—Jeffery A. Hofsass
*Attorney, Agent, or Firm*—Oliff & Berridge

[57] ABSTRACT

A rain gauge having a collecting funnel and a discharged nozzle is provided with a detector for detecting the abstraction of a filter at the input of the nozzle. The detector comprises a light source disposed on an upper portion of said funnel and illuminating the bottom of the funnel above the filter. A sensor located outside of the funnel and nozzle, detects light which is reflected and diffused by the inner surface of the funnel and which passed through the filter and along the nozzle. The sensor is offset laterally with respect to the nozzle. An electronic box is connected to the source for causing the source to emit light pulses at regular time intervals and is connected to the sensor for detecting those output signals of the sensor which exceed a predetermined threshold.

10 Claims, 3 Drawing Sheets

RAIN GAUGE WITH CLOGGING DETECTION DEVICE

BACKGROUND OF THE INVENTION

The invention relates to rain gauges of the type comprising a stationary reception funnel, having at its lower part a water discharge nozzle at the input of which a filter is disposed.

The rain gauges used practically universally by meteorological services are of the above defined type. The nozzle of the fixed reception funnel is placed above a receptacle arranged to rock on a support plate and having two symmetrical compartments alternatively receiving water flowing through the nozzle. The receptacle rocks about the horizontal edge on the plate when the amount of water contained in a compartment reaches a given value. This compartment then discharges its contents outside and the other compartment begins to receive any water which flows from the funnel. A switch, generally formed by a mercury bulb with contacts which is fixed to the receptacle indicates, by its open or closed state, the position of the receptacle. From the knowledge of the cross-sectional area of the input of the funnel and from the amount of water which causes the receptacle to rock, the amount of precipitation can be determined by counting the number of times the switch has operated and, by detecting the times of rocking with respect to data delivered by a clock, the distribution thereof in time.

Many rain gauges are located in isolated stations and are only inspected at long intervals. Between two inspections, the filter, which is intended to retain the impurities while letting the rain water or the water from molten snow pass, may be progressively clogged by debris such as leaves, dust and insects. Such progressive clogging is not detected until the first inspection which follows it. Consequently, it is impossible to know how long the filter has been clogged and to determine how long the recorded has been doubtful.

SUMMARY OF THE INVENTION

An object of the invention is to provide a rain gauge comprising a detector for detecting the obstruction of the filter, before it is complete, so as to locate it in time and give an alarm; it is a more specific object to reach this result without hindering collection of water by the funnel or the flow thereof and in limiting disturbances of the detection device during precipitations.

To this end, there is provided a rain gauge of the above defined type, comprising a device for detecting clogging of the filter having a light source disposed at the input of the funnel, placed so as to illuminate the bottom of the funnel above the filter, a sensor detecting light which is reflected and diffused by the bottom of the funnel and which passed through the filter and the nozzle, said sensor being placed below the nozzle and offset laterally with respect thereto; and electronic means connected to the source for causing the latter to emit light pulses at regular time intervals and for detecting these output signals of said sensor which exceed a predetermined threshold.

With this arrangement, the detection device does not hinder collection and flow of the water; the sensor is not directly sprinkled with water which flows through the nozzle. Contrarily to what might be feared, the amount of light received by the sensor through the filter and the funnel, when the filter is not clogged, is sufficient to permit reliable operation of the sensor despite the losses due to reflection and diffusion.

The reliability of the clogging detection device may be further increased by comparing the ratio between the number of output signals of the sensor which exceeding a threshold and the total number of light pulses emitted during a given time, one hour for example, and assuming the absence of clogging when the ratio exceeds a predetermined value, less than 1 and which may be determined experimentally. The use of such a criterion to a large extent overcomes the influence of the total reflections which are sometimes observed when rain water streams along the wall of the funnel and reduces the light intensity which reaches the sensor at a value less than the threshold. Practice has shown that in general the total reflexion phenomenon does not occur in more than 70% of the cases, i.e. for more than 70% of the time.

The monitoring of correct operation obtained by using the invention on a rain gauge makes it possible to space out and often to suppress the periodic inspections and to replace them by on the spot checking carried out solely should an alarm be given. All the advantages which result therefrom are reached if the rain gauge may operate independently, without external electric supply, for a very long time, practically of the order of one year. To allow independent operation from a source formed by a commercial battery, for example an alkaline 4.5 V battery, the electric consumption of the electronic box must be low. This result is reached using a self-sufficient electronic box incorporating: a local electric supply; means causing the emission, by the source, of light pulses at time intervals determined by a time base; a receiver connected to the sensor comprising an amplifier and threshold detector means delivering an output signal when the energy received by the sensor exceeds the threshold; and means supplying the receiver from the source solely during predetermined time intervals, corresponding to the time durations of light emissions by the source.

The invention will be better understood from the following description of a particular embodiment, given by way of example. The description refers to the accompanying drawings.

DETAILED DESCRIPTION OF THE EMBODIMENTS

Figure 1:
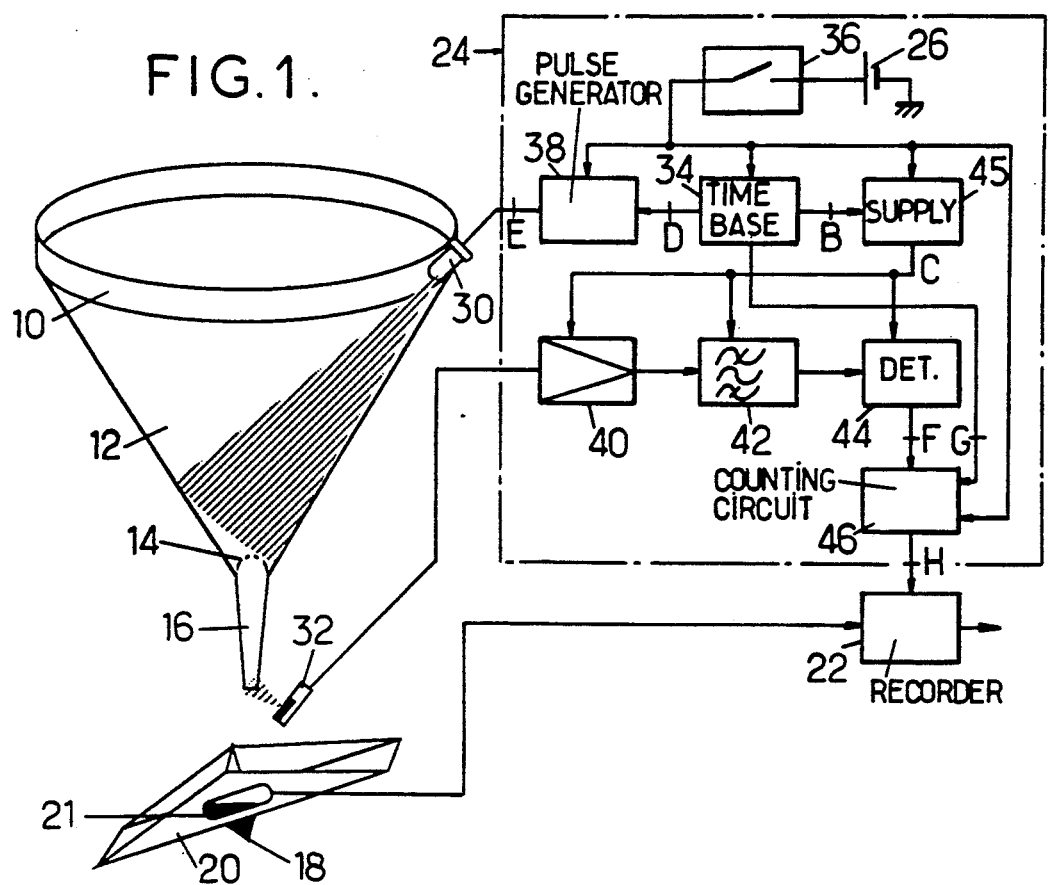
FIG. 1 is a block diagram showing the water collecting elements of a rain gauge and the essential components of a clogging detection device which equips it.

The rain gauge shown schematically in FIG. 1 has a generally known construction. It is of the type having a rocking receptacle 20 which is used practically universally in the present time. It comprises a fixed collecting funnel, with a vertical axis, having an upper receiving ring 10 with sharp edges and a cone 12 having at its lower part a metal filter 14 with fine meshes (1 to 2 mm in general). The funnel often has a rotational symmetry and its ring then has a diameter of a few tens of millimeters. The cone is extended by a nozzle 16 which opens above the horizontal oscillating edge 18 of a rocking receptacle 20. By rocking about the horizontal edge 18, the receptacle may take either the predetermined position in which it is shown in FIG. 1, or a position which is symmetrical with respect to a vertical plane passing through the edge. The receptacle rocks from one position to the other when the amount of water received by the compartment placed below the nozzle 16 has reached a given value. The filled compartment then spills its water content and the other compartment begins to receive any water flowing from the funnel. The receptacle 20 has a switch 21, actuated by rocking, generally formed by a bulb with mercury for closing contacts, which delivers information about the position of the receptacle or a pulse responsive to each rocking movement. Each rocking movement of the receptacle results from a given amount of precipitation. Counting the number of rocking occurrences and times, recorded by means 22 of known construction or transmitted to a central monitoring location by telecommunication means, make it possible to know the pluvometry at the station.

The rain gauge shown in FIG. 1 is provided with a device according to a particular embodiment of the invention. The device comprises optical means designed so that clogging of the filter forms an optical barrier and an electronic box 24, with its own electric energy source, shown as a battery 26. The only connection between the box and the outside is the delivered output information consisting binary values (0 to 1).

The optical elements of the device comprise a light source 30 disposed at the input of the funnel and a sensor 32 placed below nozzle 16 and offset laterally with respect thereto, in a position such that it receives the light from the source, reflected and diffused by the bottom of the funnel, when the filter 14 is not clogged.

Source 30 will generally be a high efficiency light emitting diode or LED, driven by shot current pulses of high intensity. For instance the LED may be of CQY 90D type sold by the firm RTC, delivering infrared radiation. Sensor 32 may then be a photodiode matched to the emission range of the LED, such as a photodiode BPW 50 from the firm RTC.

Figure 2:
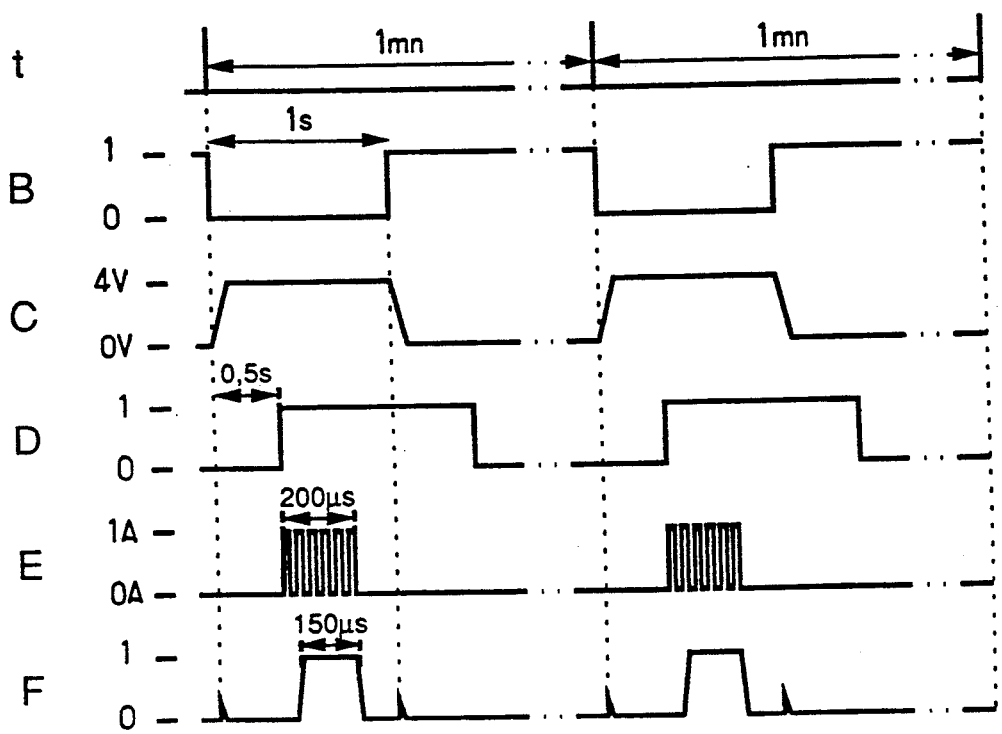
FIGS. 2 and 3 are timing diagrams showing the general shape of the signals which appear at the points indicated by letters in the block diagram of FIG. 1.

The electronic box 24 embodies low consumption components so as to have a long independent life using a commercial 4.5 volt alkaline battery as a power source. It comprises a time base 34 capable, when fed from source 26 by a manually controlled switch 36, to supply:

rectangular pulses on an output B at relatively high rate (for example, as illustrated in FIG. 2, pulses of one second at the end of each minute), on an output D, pulses delayed with respect to the preceding pulses (for example one second pulses delayed by 0.5 second with respect to those which appear at output B), on an output G, rectangular pulses, at a much slower rate than the pulses appearing at output B (for example with a period of one hour).

The advantage of having pulses appearing at the same rate, with a time offset, at outputs B and D will appear further on.

The output D of time base 34 drives the triggering input of a pulse generator 38 which, in response to the leading edge of the pulse of the time base, emits n brief successive identical pulses, each of which has a duration which is much smaller (by several orders of magnitude) than that of the pulse appearing at output D. In practice, n will be between 4 and 10. As shown in FIG. 2, a generator 38 delivering six pulses of 25 micro seconds each may possibly be used. The pulses, appearing at output E of the generator, drives source 30.

The sensor 32 is connected to a receiver circuit which, in the case illustrated in FIG. 1, comprises an amplifier 40, a band-pass filter 42 and a synchronous detector 44.

To reduce the consumption of the electronic box, the receiver circuit is not continuously supplied with power. Its power supply inputs are connected to a regulated and controlled supply circuit 45 which only switches the receiver circuit on during the time when it is likely to receive pulses caused by output B of the time base. The time which separates the leading edges of the pulses appearing at outputs B and D of the time base is selected sufficiently large so that the receiver circuit is able to operate when it receives the signals delivered by sensor 32 (FIG. 2).

The synchronous detector 44 is designed to deliver, at its output F, a square wave of calibrated length (150 $\mu s$ at mid-height for example) when the mean level of the signal received by the sensor, after filtering and detection, exceeds a predetermined threshold.

The output F of the reception circuit drives an accumulation counting circuit 46, which maintains on its output H a voltage indicating the absence of clogging during the whole time which separates two successive pulses appearing at the output G, when the number of pulses appearing at output F during the preceding time interval has exceeded a predetermined fraction of the total number of pulses expected.

Figure 3:
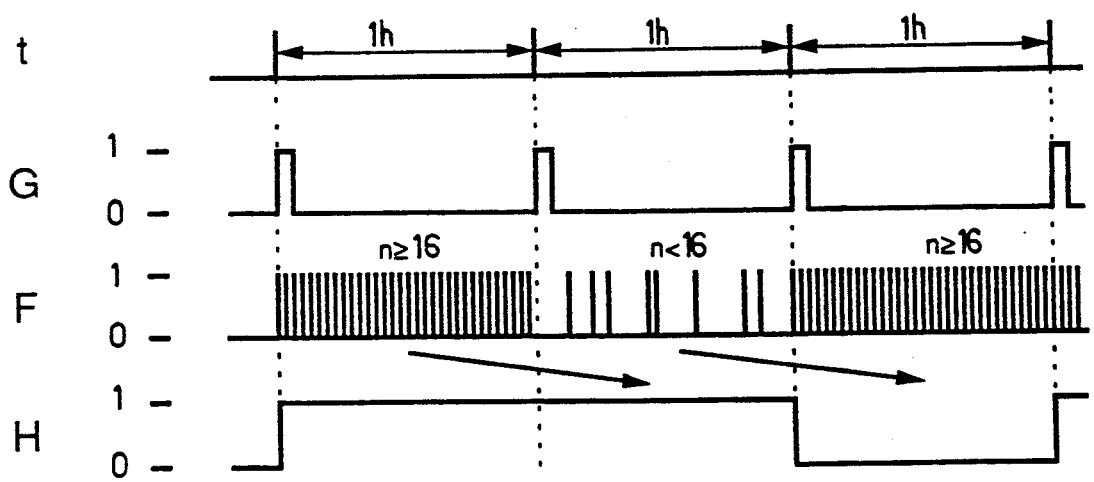

As illustrated in FIG. 3 for example, where the maximum number of pulses likely to appear at output F is 60 per hour, the output voltage of the counting and accumulation circuit 46 is kept at level 1 each time 16 pulses at least have been received during the preceding hour: this condition is only fulfilled for the first and third period of one hour.

The choice of a minimum ratio appreciably less than $\frac{1}{2}$, such as 16/60, takes into account the possibility (in the case of rain, hale or snow), of a total reflection phenomenon due to water flowing along the edges of the reception funnel, or to a temporary obturation.

Figure 5:
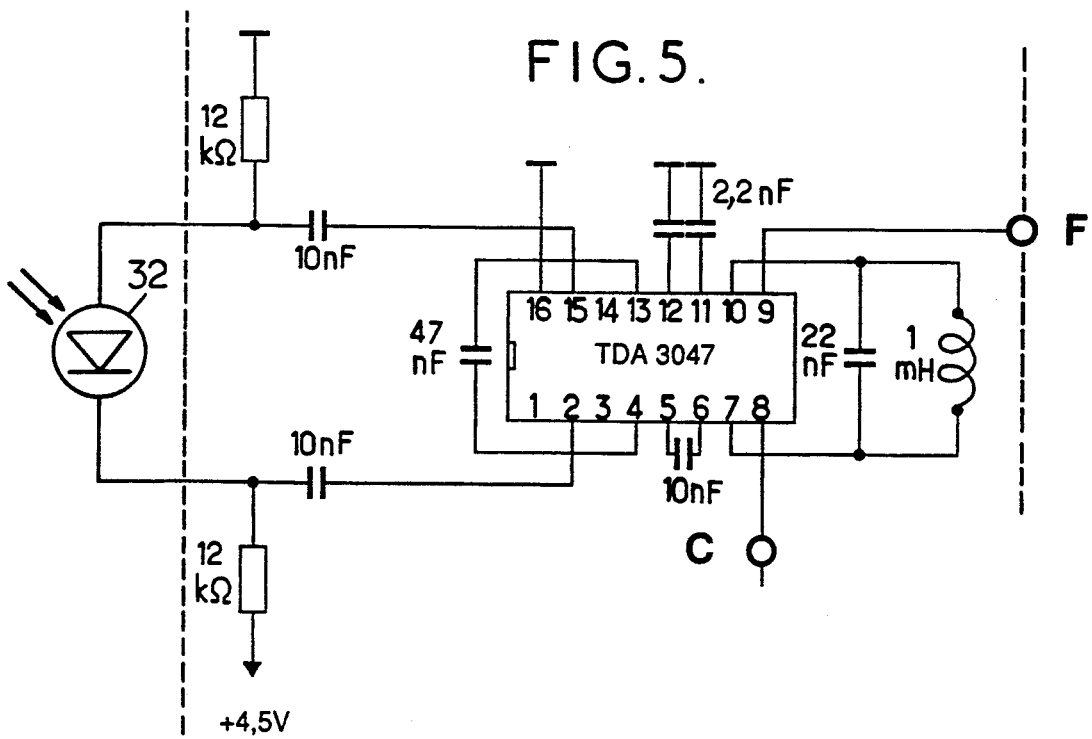
FIGS. 4, 5 and 6 block diagrams showing a possible construction of the time base, of the receiver circuit and of the generator of the device shown in FIG. 1.
Figure 4:
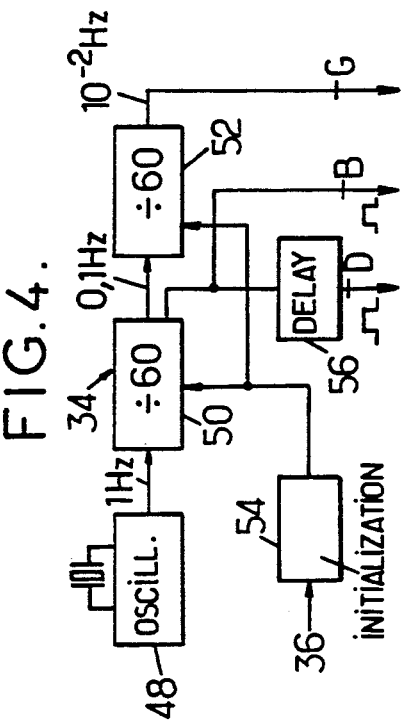
Figure 6:
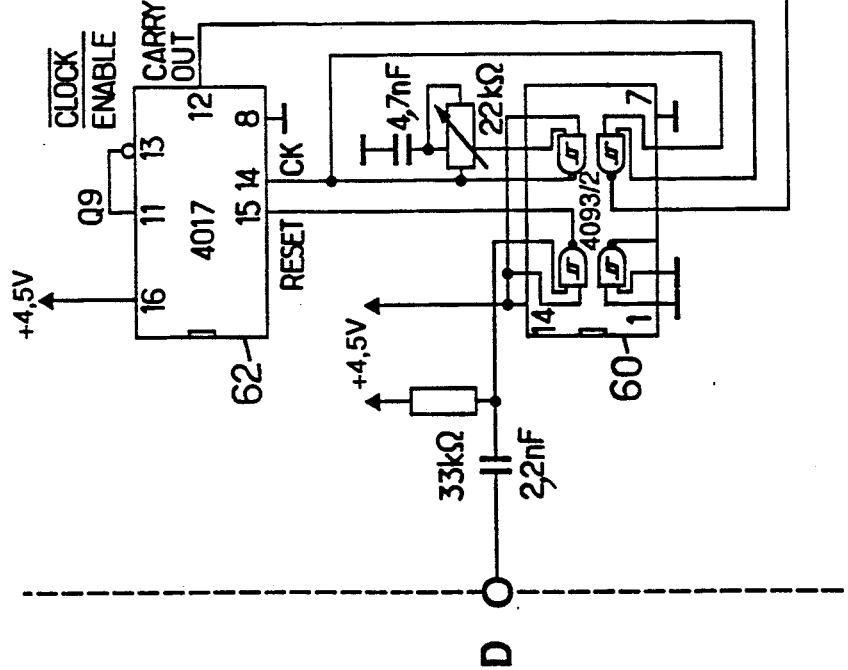

The components of the circuit shown schematically in FIG. 1 may be as shown in FIGS. 4 to 6.

In particular, the time base 34 may be as shown in FIG. 4 and comprise an oscillator 48 oscillating at a frequency of 1 Hz, followed by two cascaded dividers 50 and 52, respectively delivering frequencies of 0.1 and 0.01 Hz. An initialization circuit 54 is provided for resetting the counters each time the circuit is switched on due to closure of switch 36. Each of the dividers comprises a monostable (one-shot) for obtaining an output square wave of one second at the end of each minute or each hour, at outputs B and G. A retarder 56 receives the pulses at 1 mn rate and generates at its output D pulses of one second, delayed by 0.5 seconds with respect to those delivered by divider 50.

The components of the receiver circuit may be grouped together into a single integrated circuit. In the case illustrated in FIG. 6, the receiver comprises a circuit TDA 3047 forming amplifier, filter and synchronous detector. The reference signal required for synchronous detection may be delivered by the time base (not shown) or the generator 38. The filtering pass band is set by an inductance-capacity circuit tuned, for example, to 38 KHz in the case envisaged above.

Finally, the pulse generator 38 may have the general construction shown in FIG. 6, where the notations "reset", "CK", "carry out" and "clock enable" designate conventionally on such circuits, the reset input, the clock input, the overflow output and the clock enable input. The generator, delivering pulses at a frequency of 38 KHZ, comprises a set of four threshold comparators 60 driven by the output D of the time base 34, a decade counter 62 and an amplifier with two transistors 64 and 66 mounted in a Darlington circuit.

Numerous modifications of the invention are possible, particularly insofar as the construction of the electronic box is concerned. It should be understood that the range of the present invention is not limited to the arrangements which have been shown by way of examples.

I claim:

1. A rain gauge including:
   a stationary reception funnel opening upwardly and having a water discharge nozzle at the lower part thereof,
   a filter disposed between said funnel and nozzle, and
   a device for detecting clogging of said filter,
   wherein said device comprises:
   a light source disposed above said funnel and placed so as to illuminate an inner surface area located at the bottom of the funnel, above said filter;
   a sensor located for detecting light reflected and diffused by said inner surface area of the funnel and passed through said filter and along the nozzle, said sensor being placed below the nozzle and being offset laterally with respect thereto; and
   electronic means having an output connected to said light source for causing said light source to emit light pulses at regular time intervals and having an input connected to said sensor for detecting those output signals of said sensor which exceed a predetermined threshold.

2. Rain gauge according to claim 1, wherein said electronic means are self-sufficient and comprise: an electric supply source; a time base energized by said electric supply source; means for causing said light source to emit light pulses at said time regular intervals which are determined by said data base and responsive to signals therefrom; receiver means having an input connected to said sensor and having an amplifier and threshold detection means arranged to deliver an output signal when an amount of energy received by said sensor responsive to one of said pulses exceeds said predetermined threshold; and means for only energizing the receiving means from said electric supply source during predetermined time intervals, corresponding to time durations of light pulses from said light source.

3. Rain gauge according to claim 2, wherein said electronic means further comprise a generator for delivering a sequence consisting of a predetermined number of short electric signals for energizing the light source responsive to each signal received from said time base.

4. Rain gauge according to claim 3, wherein said detection means are constructed for synchronous detection of the signals delivered by the sensor.

5. Rain gauge according to claim 2, wherein said receiver means drive a counting and accumulation circuit which maintains a signal indicating absence of clogging on the output thereof for each of predetermined time periods when the ratio between the number of calibrated output signals actually received during the preceding one of said predetermined periods and the maximum possible number of calibrated output signals exceeds a predetermined value.

6. Rain gauge according to claim 3, wherein said receiver means drive a counting and accumulation circuit which maintains a signal indicating absence of clogging on the output thereof for each of predetermined time periods of about one hour, when the ratio between the number of calibrated output signals actually received during the preceding one of said predetermined periods and the maximum possible number of calibrated output signals during said preceding period exceeds a predetermined value.

7. Rain gauge according to claim 5, wherein said predetermined value is lower than ½.

8. Rain gauge according to claim 2, wherein said time base comprises an oscillator cascaded with divider means for delivering signals spaced by regularly distributed time intervals and for driving delay means which define the time intervals during which said receiver means are energized.

9. Rain gauge according to claim 1, wherein said light source is an infrared light emitting diode and said sensor is a photodiode.

10. Rain gauge according to claim 1, wherein said source is located on a receiver ring constituting an upper portion of the funnel and said sensor is located at a level lower than that of said nozzle and above a receptacle for receiving water flowing through and along the nozzle.

* * * * *